US010466675B2

(12) United States Patent
Gibson et al.

(10) Patent No.: US 10,466,675 B2
(45) Date of Patent: Nov. 5, 2019

(54) LASER-GUIDED CUTTING ASSEMBLY

(71) Applicants: Danny Gibson, Maryville, TN (US); Kim Gibson, Maryville, TN (US)

(72) Inventors: Danny Gibson, Maryville, TN (US); Kim Gibson, Maryville, TN (US)

( * ) Notice: Subject to any disclaimer, the term of this patent is extended or adjusted under 35 U.S.C. 154(b) by 360 days.

(21) Appl. No.: 15/352,677

(22) Filed: Nov. 16, 2016

(65) Prior Publication Data

US 2018/0136627 A1  May 17, 2018

(51) Int. Cl.
*G05B 19/402* (2006.01)
*B23D 59/00* (2006.01)
*G01S 17/10* (2006.01)
*G05B 19/048* (2006.01)
*G01S 17/88* (2006.01)
*B23D 47/04* (2006.01)

(52) U.S. Cl.
CPC .......... *G05B 19/402* (2013.01); *B23D 47/04* (2013.01); *B23D 59/001* (2013.01); *G01S 17/10* (2013.01); *G01S 17/88* (2013.01); *G05B 2219/37288* (2013.01); *G05B 2219/45044* (2013.01)

(58) Field of Classification Search
None
See application file for complete search history.

(56) References Cited

U.S. PATENT DOCUMENTS

| 6,858,857 | B2 | 2/2005 | Pease et al. | |
| 7,226,179 | B2 | 6/2007 | Garcia | |
| 8,004,664 | B2 | 8/2011 | Etter et al. | |
| 8,915,170 | B2 | 12/2014 | Koegel | |
| 2003/0010173 | A1* | 1/2003 | Hayden | B23D 59/003 83/520 |
| 2004/0261592 | A1 | 12/2004 | Chen | |
| 2006/0101969 | A1 | 5/2006 | Garcia et al. | |
| 2011/0048202 | A1* | 3/2011 | Peterson | B23D 45/044 83/471.2 |
| 2012/0255414 | A1 | 10/2012 | Koegel | |

FOREIGN PATENT DOCUMENTS

EP  2873854 A1 *  5/2015  .......... F03D 17/00
WO  WO2012138818  10/2012

* cited by examiner

*Primary Examiner* — Robert K Carpenter

(57) ABSTRACT

A laser-guided cutting assembly for severing objects includes a work surface. A severing implement is operationally coupled to the work surface. The severing implement comprises at least one blade that is configured to cut an object that is positioned on the work surface. A display and a measurer are coupled to the work surface. The measurer is laser-enabled and is operationally coupled to the display. The measurer is configured to measure a first distance between the measurer and the blade, and to measure a second distance between the measurer and an end of the object that is positioned between the blade and the measurer. A portion of the object that is positioned between the blade and the measurer has a severable length equal to the first distance minus the second distance. The display is configured to report to a user the severable length of the object.

18 Claims, 3 Drawing Sheets

LASER-GUIDED CUTTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cutting assemblies and more particularly pertains to a new cutting assembly for severing objects.

BRIEF SUMMARY OF THE INVENTION

An embodiment of the disclosure meets the needs presented above by generally comprising a work surface. A severing implement is operationally coupled to the work surface. The severing implement comprises at least one blade that is configured to cut an object that is positioned on the work surface. A display and a measurer are coupled to the work surface. The measurer is laser-enabled and is operationally coupled to the display. The measurer is configured to measure a first distance between the measurer and the blade, and to measure a second distance between the measurer and an end of the object that is positioned between the blade and the measurer. A portion of the object that is positioned between the blade and the measurer has a severable length equal to the first distance minus the second distance. The display is configured to report to a user the severable length of the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
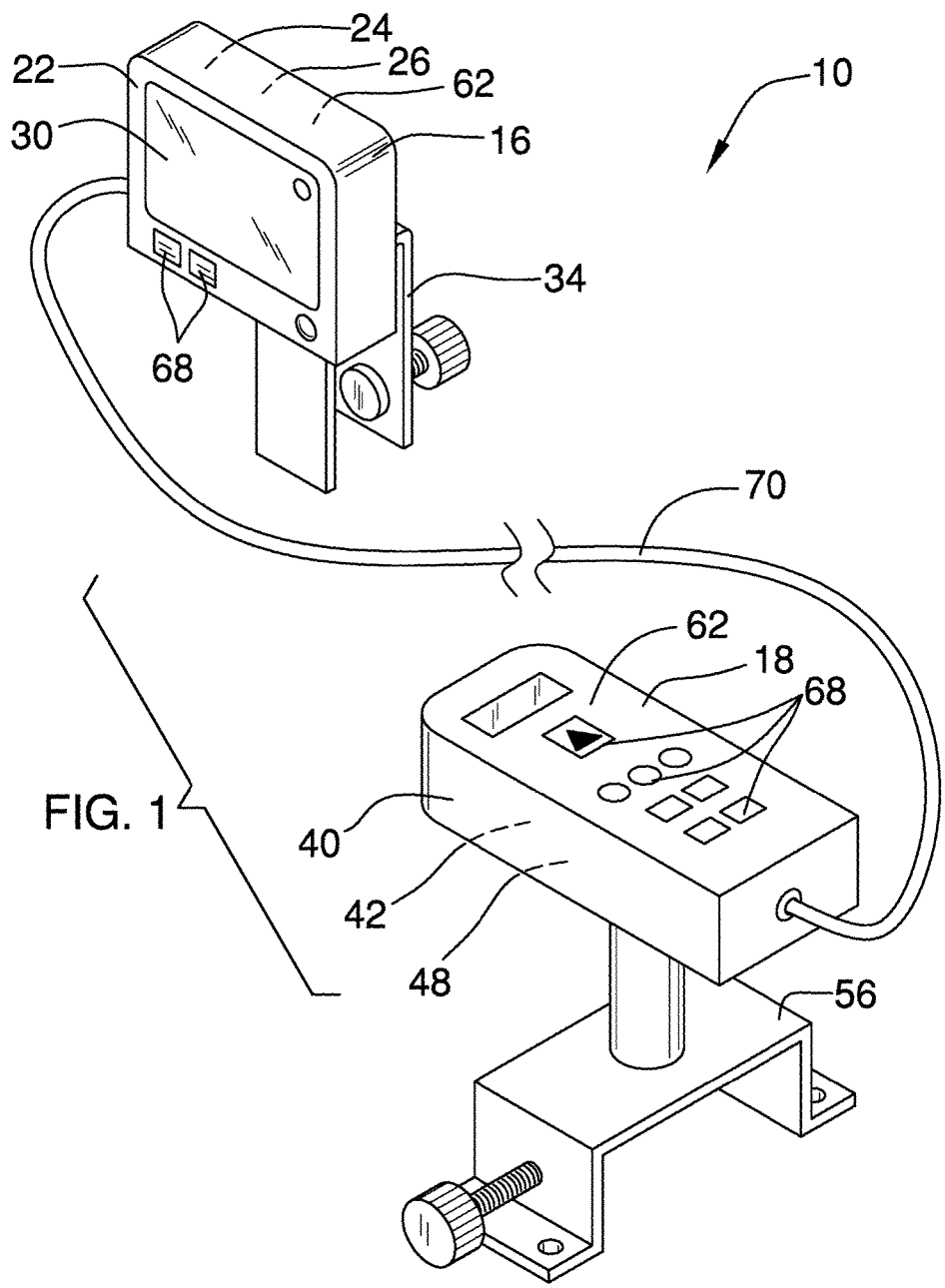
FIG. 1 is an isometric perspective view of a laser-guided cutting assembly according to an embodiment of the disclosure.
Figure 2:
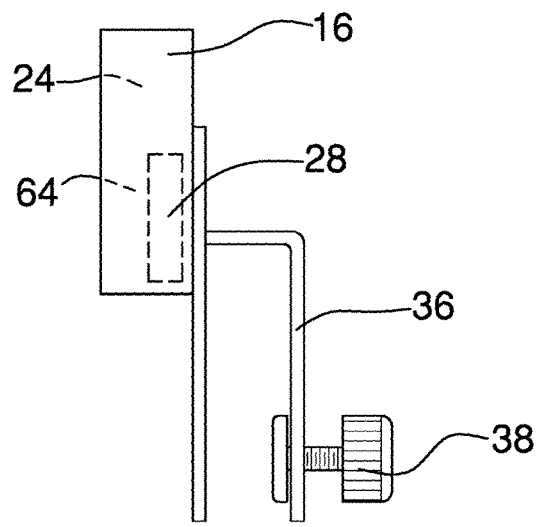
FIG. 2 is a side view of an embodiment of the disclosure.
Figure 3:
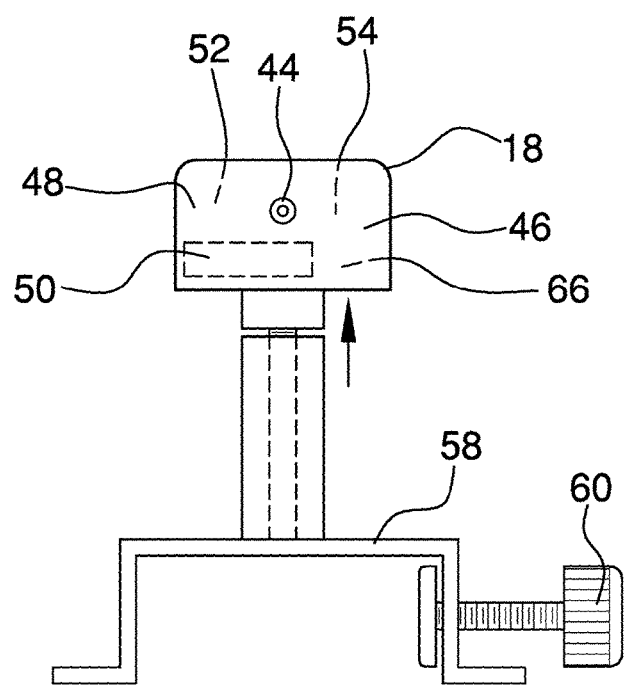
FIG. 3 is a side view of an embodiment of the disclosure.
Figure 4:
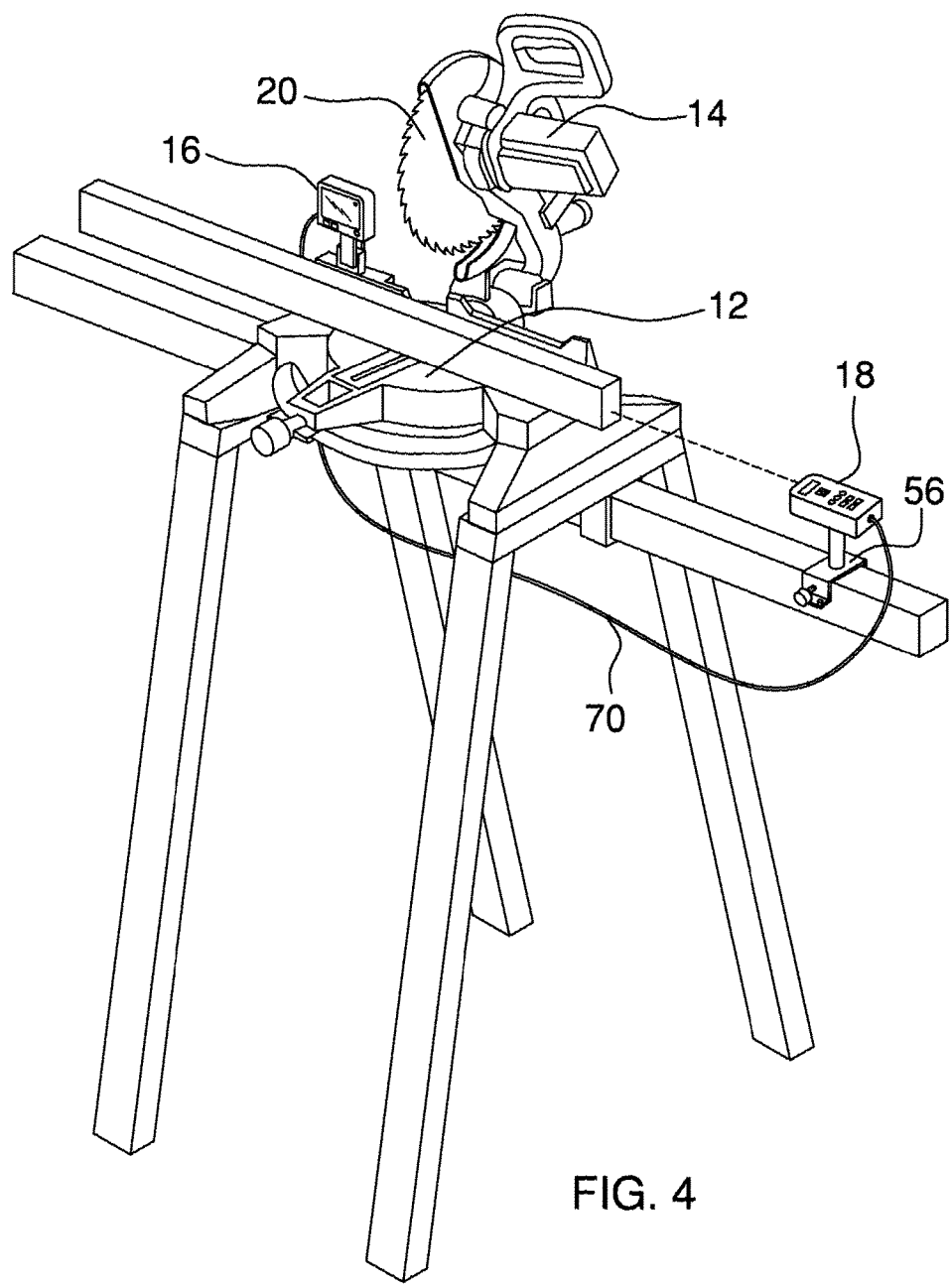
FIG. 4 is an in-use view of an embodiment of the disclosure.

With reference now to the drawings, and in particular to FIGS. 1 through 4 thereof, a new cutting assembly embodying the principles and concepts of an embodiment of the disclosure and generally designated by the reference numeral 10 will be described.

As best illustrated in FIGS. 1 through 4, the laser-guided cutting assembly 10 generally comprises a work surface 12, a severing implement 14, a display 16 and a measurer 18. The severing implement 14 is operationally coupled to the work surface 12. The severing implement 14 comprises at least one blade 20 that is configured to cut an object that is positioned on the work surface 12.

The display 16 is coupled to the work surface 12. The display 16 comprises a first housing 22 that defines an internal space 24. A first power module 26 is coupled to the first housing 22 and is positioned in the internal space 24. In one embodiment, the first power module 26 comprises at least one first battery 28. A screen 30 is coupled to a front 32 of the first housing 22. The screen 30 is operationally coupled to the first power module 26.

In another embodiment, the display 16 is reversibly couplable to the work surface 12. A second clamp 34 is coupled to the display 16. The second clamp 34 is configured for reversibly coupling the display 16 to the work surface 12. In yet another embodiment, the second clamp 34 comprises a second bracket 36 and a second screw 38. The second screw 38 is threadedly coupled to the second bracket 36. The second screw 38 is positioned in the second bracket 36 such that the second screw 38 is configured to reversibly couple the second bracket 36 to the work surface 12.

The measurer 18 is coupled to the work surface 12. The measurer 18 is laser-enabled. The measurer 18 is operationally coupled to the display 16. The measurer 18 is configured to measure a first distance between the measurer 18 and the at least one blade 20. The measurer 18 also is configured to measure a second distance between the measurer 18 and an end of the object that is positioned between the at least one blade 20 and the measurer 18. A portion of the object that is positioned between the at least one blade 20 and the measurer 18 has a severable length equal to the first distance minus the second distance. The display 16 is coupled to the measurer 18 such that the display 16 is configured to report to a user the severable length of the object.

The measurer 18 comprises a second housing 40 that defines an interior space 42. A lens 44 is positioned in a wall 46 of the second housing 40. A second power module 48 is coupled to the second housing 40 and is positioned in the interior space 42. In one embodiment, the second power module 48 comprises at least one second battery 50. A pulsed laser 52 is coupled to the second housing 40 and is positioned in the interior space 42. The pulsed laser 52 is operationally coupled to the second power module 48. The pulsed laser 52 is positioned in the second housing 40 such that the pulsed laser 52 is configured to project a laser beam through the lens 44. A photodiode 54 is coupled to the second housing 40 and is positioned in the interior space 42. The photodiode 54 is operationally coupled to the second power module 48. The photodiode 54 is positioned in the second housing 40 such that the photodiode 54 is configured to detect the laser beam upon reflection of the laser beam off of the at least one blade 20 and the end of the object.

In another embodiment, the measurer 18 is reversibly couplable to the work surface 12. A first clamp 56 is coupled to the measurer 18. The first clamp 56 is configured to reversibly couple the measurer 18 to the work surface 12. In yet another embodiment, the first clamp 56 comprises a first bracket 58 and a first screw 60. The first screw 60 is threadedly coupled to the first bracket 58. The first screw 60 is positioned in the first bracket 58 such that the first screw 60 is configured to reversibly couple the first bracket 58 to the work surface 12.

A control module 62 is operationally coupled to the display 16 and the measurer 18. The control module 62 is positioned to compel the measurer 18 to measure the first distance and the second distance and to compel the display 16 to report to the user the severable length of the object. In one embodiment, the control module 62 is coupled to the first housing 22 and is positioned in the internal space 24. The control module 62 comprises a first microprocessor 64. The first microprocessor 64 is coupled to the first housing 22 and is positioned in the internal space 24. The first microprocessor 64 is operationally coupled to the first power module 26 and the screen 30.

In another embodiment, the control module 62 comprises a second microprocessor 66. The second microprocessor 66 is coupled to the second housing 40 and is positioned in the interior space 42. The second microprocessor 66 is operationally coupled to the second power module 48 and the screen 30.

An input panel 68 is operationally coupled to the control module 62. The input panel 68 is configured to enter commands to compel the control module 62 to compel the measurer 18 to measure the first distance and the second distance and to compel the display 16 to report to the user the severable length of the object.

In one embodiment, a cable 70 is operationally coupled to the display 16 and the measurer 18. The cable 70 is positioned to relay signals between the display 16 and the measurer 18.

In use, the pulsed laser 52 is positioned in the second housing 40 such that the pulsed laser 52 is configured to project a laser beam through the lens 44. The photodiode 54 is positioned in the second housing 40 such that the photodiode 54 is configured to detect the laser beam upon reflection of the laser beam off of the at least one blade 20 and the end of the object. The measurer 18 is configured to measure the first and the second distance. The portion of the object that is positioned between the at least one blade 20 and the measurer 18 has a severable length equal to the first distance minus the second distance. The display 16 is coupled to the measurer 18 such that the display 16 is configured to report to the user the severable length of the object.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A laser-guided cutting assembly comprising:
   a work surface;
   a severing implement operationally coupled to said work surface, said severing implement comprising at least one blade configured for cutting an object positioned on said work surface;
   a display coupled to said work surface;
   a measurer coupled to said work surface, said measurer being laser-enabled, said measurer being operationally coupled to said display; and
   wherein said measurer is positioned on said work surface such that said measurer is configured for measuring a first distance between said measurer and said at least one blade, wherein said measurer is configured for measuring a second distance between said measurer and an end of the object positioned between said at least one blade and said measurer, such that a portion of the object positioned between said at least one blade and said measurer has a severable length equal to the first distance minus the second distance, wherein said display is coupled to said measurer such that said display is configured to report to a user the severable length of the object.

2. The assembly of claim 1, further including said display being reversibly couplable to said work surface.

3. The assembly of claim 1, further including said display comprising:
   a first housing defining an internal space;
   a first power module coupled to said first housing and positioned in said internal space; and
   a screen coupled to a front of said first housing, said screen being operationally coupled to said first power module.

4. The assembly of claim 3, further including said first power module comprising at least one first battery.

5. The assembly of claim 1, further including said measurer being reversibly couplable to said work surface.

6. The assembly of claim 3, further including said measurer comprising:
   a second housing defining an interior space;
   a lens positioned in a wall of said second housing;

a second power module coupled to said second housing and positioned in said interior space;

a pulsed laser coupled to said second housing and positioned in said interior space, said pulsed laser being operationally coupled to said second power module;

a photodiode coupled to said second housing and positioned in said interior space, said photodiode being operationally coupled to said second power module; and wherein said pulsed laser is positioned in said second housing such that said pulsed laser is configured to project a laser beam through said lens, wherein said photodiode is positioned in said second housing such that said photodiode is configured to detect the laser beam upon reflection of the laser beam off of said at least one blade and the end of the object.

7. The assembly of claim 6, further including said second power module comprising at least one second battery.

8. The assembly of claim 6, further including a control module operationally coupled to said display and said measurer such that said control module is positioned to compel said measurer to measure the first distance and the second distance and to compel said display to report to the user the severable length of the object, said control module being coupled to said first housing and positioned in said internal space.

9. The assembly of claim 8, further including said control module comprising a first microprocessor, said first microprocessor being coupled to said first housing and positioned in said internal space, said first microprocessor being operationally coupled to said first power module and said screen.

10. The assembly of claim 8, further including said control module comprising a second microprocessor, said second microprocessor being coupled to said second housing and positioned in said interior space, said second microprocessor being operationally coupled to said second power module and said screen.

11. The assembly of claim 8, further including an input panel operationally coupled to said control module, said input panel being configured for entry of commands to compel said control module to compel said measurer to measure the first distance and the second distance and to compel said display to report to the user the severable length of the object.

12. The assembly of claim 1, further including a cable operationally coupled to said display and said measurer such that said cable is positioned to relay signals between said display and said measurer.

13. The assembly of claim 1, further including a first clamp coupled to said measurer, said first clamp being configured for reversibly coupling said measurer to said work surface.

14. The assembly of claim 13, further including said first clamp comprising a first bracket and a first screw, said first screw being threadedly coupled to said first bracket, wherein said first screw is positioned in said first bracket such that said first screw is configured for reversibly coupling said first bracket to said work surface.

15. The assembly of claim 1, further including a second clamp coupled to said display, said second clamp being configured for reversibly coupling said display to said work surface.

16. The assembly of claim 15, further including said second clamp comprising a second bracket and a second screw, said second screw being threadedly coupled to said second bracket, wherein said second screw is positioned in said second bracket such that said second screw is configured for reversibly coupling said second bracket to said work surface.

17. A laser-guided cutting assembly comprising:

a work surface;

a severing implement operationally coupled to said work surface, said severing implement comprising a at least one blade configured for cutting an object positioned on said work surface;

a display coupled to said work surface, said display being reversibly couplable to said work surface, said display comprising:
  a first housing defining an internal space,
  a first power module coupled to said first housing and positioned in said internal space, said first power module comprising at least one first battery, and
  a screen coupled to a front of said first housing, said screen being operationally coupled to said first power module;

a measurer coupled to said work surface, said measurer being laser-enabled, said measurer being operationally coupled to said display, wherein said measurer is positioned on said work surface such that said measurer is configured for measuring a first distance between said measurer and said at least one blade, wherein said measurer is configured for measuring a second distance between said measurer and an end of the object positioned between said at least one blade and said measurer, such that a portion of the object positioned between said at least one blade and said measurer has a severable length equal to the first distance minus the second distance, wherein said display is coupled to said measurer such that said display is configured to report to a user the severable length of the object, said measurer being reversibly couplable to said work surface, said measurer comprising:
  a second housing defining an interior space,
  a lens positioned in a wall of said second housing,
  a second power module coupled to said second housing and positioned in said interior space, said second power module comprising at least one second battery,
  a pulsed laser coupled to said second housing and positioned in said interior space, said pulsed laser being operationally coupled to said second power module, wherein said pulsed laser is positioned in said second housing such that said pulsed laser is configured to project a laser beam through said lens, and
  a photodiode coupled to said second housing and positioned in said interior space, said photodiode being operationally coupled to said second power module, wherein said photodiode is positioned in said second housing such that said photodiode is configured to detect the laser beam upon reflection of the laser beam off of said at least one blade and the end of the object;

a control module operationally coupled to said display and said measurer such that said control module is positioned to compel said measurer to measure the first distance and the second distance and to compel said display to report to the user the severable length of the object, said control module being coupled to said first housing and positioned in said internal space, said control module comprising a first microprocessor, said first microprocessor being coupled to said first housing and positioned in said internal space, said first microprocessor being operationally coupled to said first power module and said screen;

an input panel operationally coupled to said control module, said input panel being configured for entry of commands to compel said control module to compel said measurer to measure the first distance and the second distance and to compel said display to report to the user the severable length of the object;

a cable operationally coupled to said display and said measurer such that said cable is positioned to relay signals between said display and said measurer;

a first clamp coupled to said measurer, said first clamp being configured for reversibly coupling said measurer to said work surface, said first clamp comprising a first bracket and a first screw, said first screw being threadedly coupled to said first bracket, wherein said first screw is positioned in said first bracket such that said first screw is configured for reversibly coupling said first bracket to said work surface;

a second clamp coupled to said display, said second clamp being configured for reversibly coupling said display to said work surface, said second clamp comprising a second bracket and a second screw, said second screw being threadedly coupled to said second bracket, wherein said second screw is positioned in said second bracket such that said second screw is configured for reversibly coupling said second bracket to said work surface; and wherein said pulsed laser is positioned in said second housing such that said pulsed laser is configured to project a laser beam through said lens, wherein said photodiode is positioned in said second housing such that said photodiode is configured to detect the laser beam upon reflection of the laser beam off of said at least one blade and the end of the object such that said measurer is configured for measuring the first distance between said measurer and said at least one blade and the second distance between said measurer and an end of the object positioned between said at least one blade and said measurer, such that a portion of the object positioned between said at least one blade and said measurer has a severable length equal to the first distance minus the second distance, wherein said display is coupled to said measurer such that said display is configured to report to a user the severable length of the object.

18. The assembly of claim 17, further including said control module comprising a second microprocessor, said second microprocessor being coupled to said second housing and positioned in said interior space, said second microprocessor being operationally coupled to said second power module and said screen.

\* \* \* \* \*